United States Patent
Hu et al.

(10) Patent No.: US 12,184,458 B2
(45) Date of Patent: Dec. 31, 2024

(54) CARRIER FREQUENCY OFFSET SYNCHRONIZATION METHOD FOR THE VDE-TER SYSTEM

(71) Applicant: Dalian Maritime University, Dalian (CN)

(72) Inventors: Qing Hu, Dalian (CN); Yuanyuan Hu, Dalian (CN)

(73) Assignee: Dalian Maritime University, Dalian (CN)

( * ) Notice: Subject to any disclaimer, the term of this patent is extended or adjusted under 35 U.S.C. 154(b) by 0 days.

(21) Appl. No.: 18/038,238

(22) PCT Filed: Dec. 15, 2022

(86) PCT No.: PCT/CN2022/139247
§ 371 (c)(1),
(2) Date: May 23, 2023

(87) PCT Pub. No.: WO2023/109896
PCT Pub. Date: Jun. 22, 2023

(65) Prior Publication Data
US 2024/0372760 A1 Nov. 7, 2024

(30) Foreign Application Priority Data
Dec. 15, 2021 (CN) .......................... 202111538031.9

(51) Int. Cl.
*H04L 27/00* (2006.01)
(52) U.S. Cl.
CPC .. *H04L 27/0014* (2013.01); *H04L 2027/0026* (2013.01)
(58) Field of Classification Search
CPC .................. H04L 27/0014; H04L 2027/0026
See application file for complete search history.

(56) References Cited

U.S. PATENT DOCUMENTS

| | | | | |
|---|---|---|---|---|
| 2010/0260391 A1* | 10/2010 | Ichitani | .................. | G06T 7/0012 382/128 |
| 2013/0272452 A1* | 10/2013 | Zhang | .................. | H04L 27/2657 375/316 |
| 2023/0261675 A1* | 8/2023 | Hu | ........................ | H03M 13/45 714/746 |

FOREIGN PATENT DOCUMENTS

| CN | 106656899 A | 5/2017 |
|---|---|---|
| CN | 111884964 A | 11/2020 |

(Continued)

OTHER PUBLICATIONS

Fan Jiahui, et al., Research on frequency offset estimation and phase tracking algorithm in VDES, Electronic Measurement Technology, 2020, pp. 51-56, vol. 43, Issue 23.

*Primary Examiner* — Sung S Ahn
(74) *Attorney, Agent, or Firm* — Bayramoglu Law Offices LLC

(57) ABSTRACT

An improved carrier frequency offset synchronization method for the VDE-TER system includes matching and filtering the data at a receiver of the system, extracting a training sequence from an information data segment after matching and filtering; performing a carrier frequency offset estimation based on the training sequence to obtain a frequency offset estimated value; based on the frequency offset estimated value, performing a frequency offset compensation on the information data segment to obtain a first-level compensation data segment; performing a phase tracking on the first-level compensation data segment to obtain a cumulative phase compensation value, thereby obtaining a second-level compensation data segment; and demodulating the second-level compensation data segment to obtain the received information after synchronization. The method is based on a double Barker code training sequence, which reduces the bit error rate and optimizes the synchronization (Continued)

performance of the system under the condition of low-frequency offset.

3 Claims, 4 Drawing Sheets

(56) References Cited

FOREIGN PATENT DOCUMENTS

| | | |
|---|---|---|
| CN | 114244663 A | 3/2022 |
| WO | 2013056653 A1 | 4/2013 |

* cited by examiner

CARRIER FREQUENCY OFFSET SYNCHRONIZATION METHOD FOR THE VDE-TER SYSTEM

CROSS-REFERENCES TO THE RELATED APPLICATIONS

This application is the national phase entry of International Application No. PCT/CN2022/139247, filed on Dec. 15, 2022, which is based upon and claims priority to Chinese Patent Application No. 202111538031.9, filed on Dec. 15, 2021, the entire contents of which are incorporated herein by reference.

TECHNICAL FIELD

The present invention relates to the field of maritime wireless communication technology, in particular to an improved carrier frequency offset synchronization method for the VDE-TER system.

BACKGROUND

The VHF Data Exchange System (VDES) is an enhanced and upgraded system for AIS (Automatic Identification System). VDES includes AIS, ASM (Application Specific Messages), and VDE (VHF Data Exchange). VDE includes VDE-TER (VDE-Terrestrial) and VDE-SAT (VDE-Satellite). Compared with AIS, the VDE-TER channel provides a higher data communication rate, so there is a higher communication synchronization performance requirement between VDE-TER transceivers. Carrier synchronization is to recover the received wireless signal to the state closest to the transmitted wireless signal waveform, to improve the accuracy of signal demodulation, and ensure the correct transmission of information. In wireless digital communication, the signal will introduce frequency offset due to the instability of the transceiver crystal oscillator circuit, resulting in the signal can not be judged correctly, an increasing error rate of the system, and a decreasing synchronization performance. Therefore, carrier frequency offset synchronization is a key part of system synchronization, which directly affects the synchronization performance of the VDE-TER system and whether the system can work normally.

At present, the existing frequency offset synchronization methods are mainly divided into two types, the data-aided (DA) method, and the non-data-aided (NDA) method. The DA method needs to send a training sequence or pilot sequence at the transmitter, and the sequence is known by default at the receiver, and the receiver uses the sequence for synchronization. The NDA method does not need any known sequence information and directly uses the number of receivers.

However, there are few carrier frequency offset synchronization methods for the VDE-TER system. For the existing two traditional frequency offset synchronization methods DA and NDA, since each frame of data in VDE-TER contains a fixed known training sequence, and the training sequence consists of a 1-bit and 13-bit Barker code and negative code of 13-bit Barker code, the system is more suitable for the DA synchronization method, and the DA method has higher accuracy. However, when the existing DA method is directly applied to the VDE-TER system, the bit error rate is high and the system cannot work normally. Therefore, the traditional DA method is less applicable to the VDE-TER system.

SUMMARY

According to the above-mentioned technical problems the existing frequency offset synchronization methods have a high bit error rate and low adaptability to the VDE-TER system. An improved carrier frequency offset synchronization method for the VDE-TER system is provided, which reduces the system bit error rate and improves the system synchronization performance compared with the existing method.

The technical means used in the invention are as follows:

An improved carrier frequency offset synchronization method for the VDE-TER system is proposed, the method runs in a VDE-TER baseband chip, the VDE-TER baseband chip includes an analog-to-digital conversion module, a modulation and demodulation module, a pulse shaping and matching filter module, a frequency offset synchronization module and a phase tracking module, when the VDE-TER baseband chip is running, the data is synchronized based on the frequency offset synchronization module and the phase tracking module, and then the data is demodulated based on the demodulation module.

The method includes the following steps:

Matching and filtering the data at a receiver of the system, and extracting a training sequence from an information data segment after matching and filtering.

Performing a carrier frequency offset estimation based on the training sequence to obtain a frequency offset estimated value.

Based on the frequency offset estimated value, performing a frequency offset compensation on the information data segment to obtain a first-level compensation data segment.

Performing phase tracking on the first-level compensation data segment to obtain a cumulative phase compensation value, thereby obtaining a second-level compensation data segment.

Demodulating the second-level compensation data segment to obtain the received information after synchronization.

Furthermore, performing the carrier frequency offset estimation based on the training sequence to obtain the frequency offset estimated value, including:

Obtaining a 13-bit Barker code and a corresponding negative code of the 13-bit Barker code in the training sequence.

Obtaining a conjugate of the negative code of the 13-bit Barker code in the training sequence.

The conjugate of the negative code of the 13-bit Barker code is one-to-one corresponding to the 13-bit Barker code, and calculating a phase difference respectively, each phase difference corresponds to a frequency offset estimated value.

Obtaining the final frequency offset estimated value by averaging 13 frequency offset estimated values.

Furthermore, performing the phase tracking on the first-level compensation data segment to obtain the cumulative phase compensation value, thereby obtaining the second-level compensation data segment, including:

Obtaining the phase difference between a constellation of each data in the first-order compensation data segment and the accurate constellation.

Comparing the phase difference of the constellation after adding a previous data bit, the result is the phase offset compensation value of the next bit.

Correcting each bit in the first-level compensation data segment to obtain the second-level compensation data segment based on the phase offset compensation value of each bit. Compared with the existing technology, the invention has the following advantages:

The invention mainly aims at the frequency offset synchronization problem of the VDE-TER system and designs a carrier frequency offset synchronization method. Based on the fixed training sequence unique to the VDE-TER system, the 13-bit Barker code and its corresponding negative code are extracted to obtain the compensation data result, which makes up for the lack of synchronization method in the VDE-TER system.

The invention improves the existing carrier frequency offset synchronization method based on the double Barker code training sequence, and adds a tracking method to obtain phase offset compensation based on the constellation phase difference. In the case of low-frequency offset, the bit error rate is reduced and the synchronization performance of the system is optimized.

BRIEF DESCRIPTION OF THE DRAWINGS

In order to more clearly explain the technical solution in the embodiment or existing technology of the invention, the drawings used in the embodiment or existing technology description will be introduced briefly in the following. Obviously, the drawings in the following description are some embodiments of the invention. For ordinary technicians in this field, other drawings can be obtained according to these drawings without paying creative labor.

DETAILED DESCRIPTION OF THE EMBODIMENTS

Figure 1:
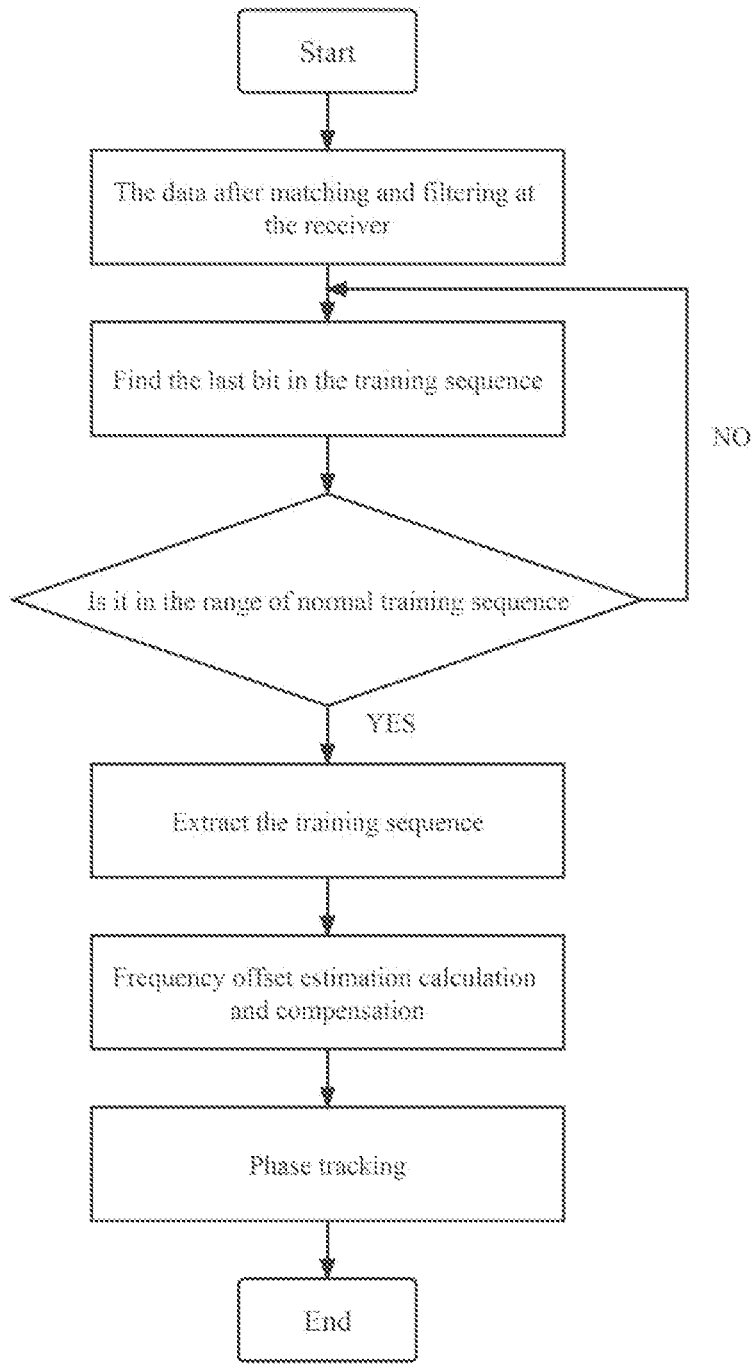
FIG. 1 is a flow chart of the carrier frequency offset synchronization method in the invention.

In order to make the personnel in the technical field better understand the technical solution of the present invention, the technical solution and the drawing in the embodiment of the invention will be clearly described in the following. Obviously, the described embodiment is only part of the embodiments of the present invention, not all of the embodiments. Based on the embodiment in this invention, all other embodiments obtained by ordinary technicians in this field without making creative labor should belong to the protection scope of this invention.

In addition, for the frequency offset synchronization of the VDE-TER system, there is a method to use the special structure of the system training sequence as a double Barker code for frequency offset synchronization at present. Although the bit error rate of this method is lower than that of the DA method, this method is suitable for the case of large frequency offset. When the frequency offset is small, the system bit error rate will increase and its synchronization performance will decrease, the invention is improved and added based on this method.

Figure 2:
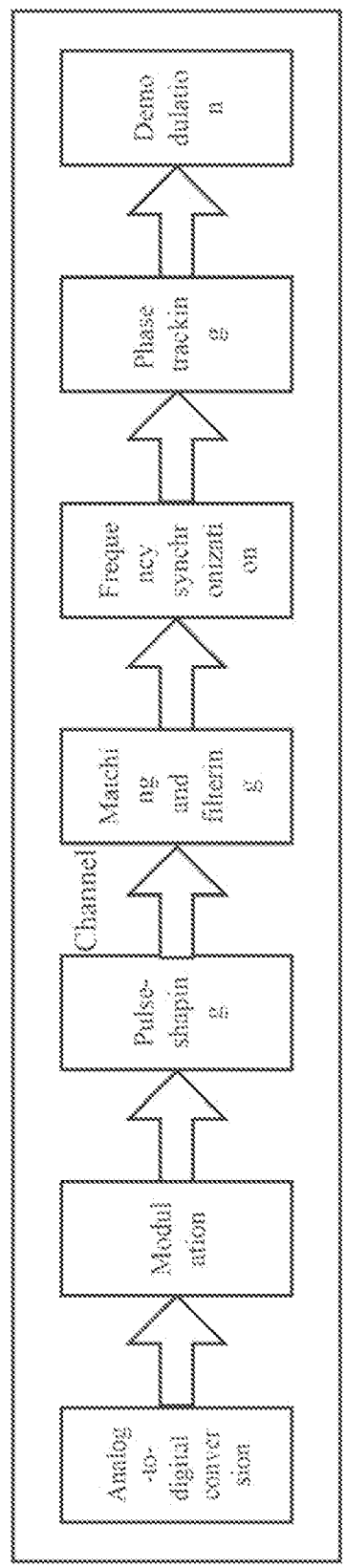
FIG. 2 is a diagram of a VDE-TER baseband chip module in the invention.

As shown in FIG. 1, an improved carrier frequency offset synchronization method for the VDE-TER system is proposed, the method runs in the VDE-TER baseband chip. As shown in FIG. 2, the VDE-TER baseband chip includes an analog-to-digital conversion module, a modulation and demodulation module, a pulse shaping and matching filter module, a frequency offset synchronization module, and a phase tracking module, when the VDE-TER baseband chip is running, the data is synchronized based on the frequency offset synchronization module and the phase tracking module, and then the data is demodulated based on the demodulation module.

The above method mainly includes the following steps:

S1, matching and filtering the data at a receiver of the system, and extracting a training sequence from an information data segment after matching and filtering.

Specifically, the information data were modulated and pulse-shaped at the transmitter, and then entered the receiver through a channel, the modulation method used the 16QAM modulation specified in the ITU-R M.1139-Ed.2-The-Technical-Specification-of-VDES. Then matching and filtering were performed for the data at the receiver, the root raised cosine filter was used for pulse shaping at the transmitter, and matching and filtering at the receiver to eliminate inter-symbol interference, the roll-off factor is specified as 0.3 in the VDES protocol.

Performing a carrier frequency offset estimation based on the training sequence to obtain a frequency offset estimated value, specifically, including:

S201, obtaining a 13-bit Barker code and a corresponding negative code of the 13-bit Barker code in the training sequence;

S202, obtaining a conjugate of the negative code of the 13-bit Barker code in the training sequence;

S203, the conjugate of the negative code of the 13-bit Barker code is one-to-one corresponding to the 13-bit Barker code, and calculating a phase difference respectively, each phase difference corresponds to a frequency offset estimated value;

S204, Obtaining the final frequency offset estimated value by averaging 13 frequency offset estimated values.

Specifically, this step was performed according to the following model:

$$F_{Frequency\_Offset} = p(X_{Receiving\_Training}, T_{Symbol\_Cycle})$$

In the formula, $F_{Frequency\_Offset}$ is the estimated carrier frequency offset value, $X_{Receiving\_Training}$ is the extracted training sequence, $T_{Symbol\_Cycle}$ is the symbol period. Preferably, the invention calculated and obtained the frequency offset estimated value according to the following formula:

$$\Delta\varphi(k) = \arg\left\{\frac{r^*(k+13)}{r(k)}\right\} = (\arg\{\exp[-j(4k\pi T + 26\pi T)f_d]\} - \pi)_{2\pi}$$

$$f_d(k) = \frac{(\Delta\varphi(k) + \pi)_{2\pi}}{4k\pi T + 26\pi T}$$

$$f_d = \frac{1}{13}\sum_{2}^{14} f_d(k)$$

Among them, r(k) is the 13-bit Barker code, r*(k+13) is the conjugate of its corresponding negative code, k is the number of bits, T is the symbol period, Δφ(k) is the difference, and $f_d$ is the frequency offset estimated value.

S3, based on the frequency offset estimated value, performing a frequency offset compensation on the information data segment to obtain a first-level compensation data segment.

S4, performing a phase tracking on the first-level compensation data segment to obtain a cumulative phase compensation value, thereby obtaining a second-level compensation data segment, specifically, including:

S401, obtaining the phase difference between a constellation of each data in the first-order compensation data segment and the accurate constellation;

S402, comparing the phase difference of the constellation after adding a previous data bit, the result is as the phase offset compensation value of the next bit;

S403, correcting each bit in the first-level compensation data segment to obtain the second-level compensation data segment based on the phase offset compensation value of each bit.

Specifically, this step was performed according to the following model:

$$F_{Data\_Segment}=q(X_{Data},X_{Standard\_Constellation})$$

In the formula, after the model was completed, returned to $F_{Data\_Segment}$, which is the data segment after phase tracking, that is, the second-level compensation data segment, $X_{Data}$ is the first-level compensation data segment obtained by step 3 and $X_{Standard\_Constellation}$ is the standard constellation of 16QAM. Preferably, the phase tracking process in the embodiment of the invention was shown in FIG. 4.

5, demodulating the second-level compensation data segment to obtain the received information after synchronization.

Figure 3:
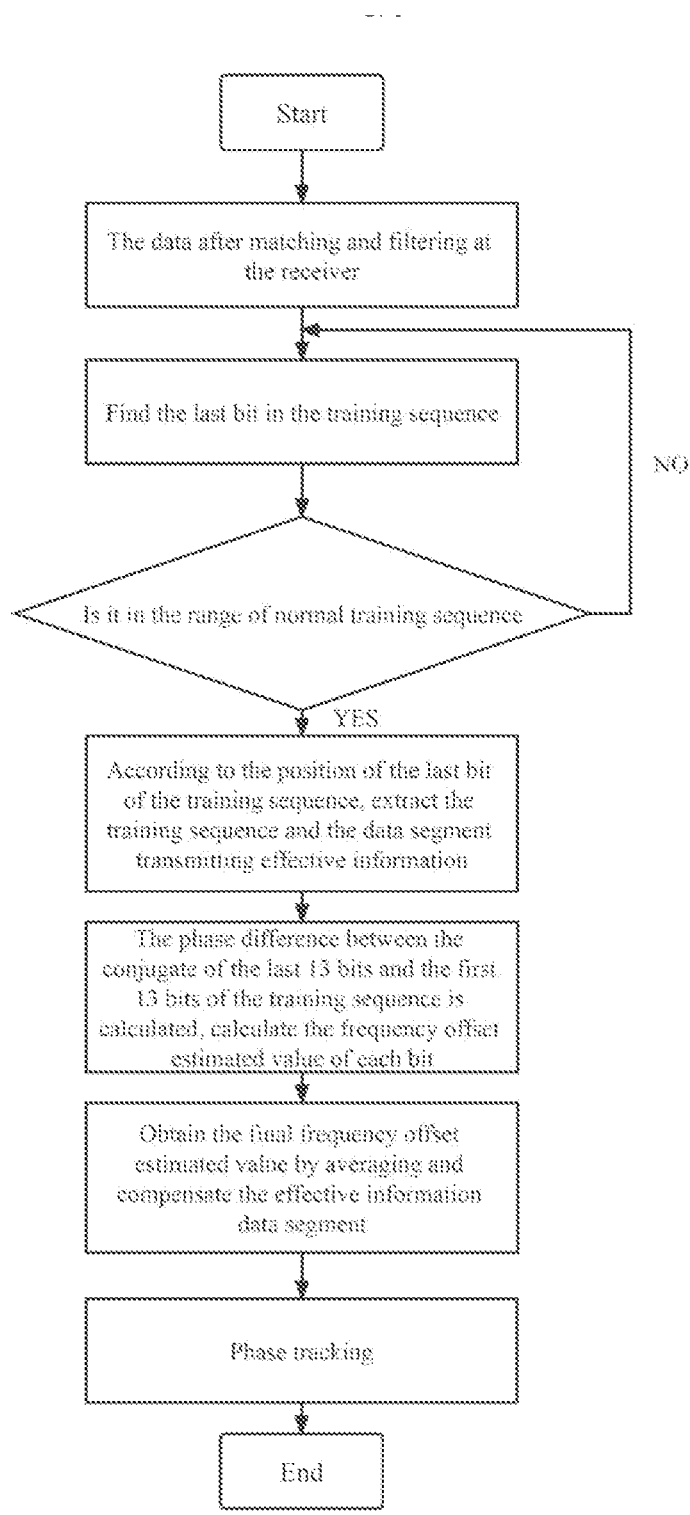
FIG. 3 is a specific implementation process of the carrier frequency offset synchronization method in the embodiment.
Figure 4:
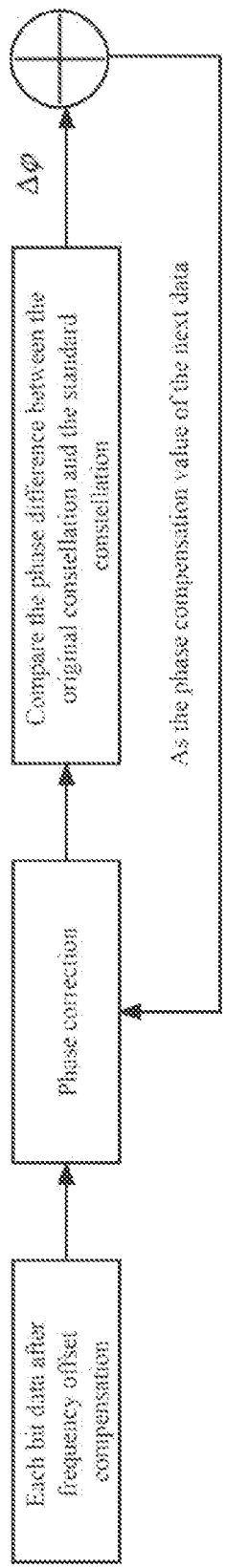
FIG. 4 is a specific implementation process of phase tracking in the embodiment.

In this embodiment, the training sequence was extracted at the receiver of the system, and the phase difference between the 13-bit Barker code symbol and the conjugate of its corresponding inverse code symbol was obtained, the phase difference of each bit can derive a frequency offset estimated value, and the 13 frequency offset estimated values are averaged to obtain the final frequency offset estimated value, the frequency offset estimated value obtained in the previous step was used to compensate the frequency offset of the data segment, the flow chart of this part was shown in FIG. 3. Because the compensated data still has residual frequency offset, and the residual frequency offset will lead to the deviation of the constellation, therefore the phase tracking of each data bit was continued, the phase difference between the constellation of a data bit after the rough synchronization and the accurate constellation was compared, and accumulate the difference between the constellation obtained by the comparison of the previous data bits as the phase offset compensation value of the next bit. After the next phase offset is corrected, the difference of the constellation is compared, and the difference before the accumulation is continued. By analogy, the flow chart of this part is shown in FIG. 4; after phase tracking, the final data segment after carrier frequency offset synchronization is obtained.

Specifically, in this implementation, the transmitter sends a frame of data, adding the original frequency offset of 150 Hz, and the channel is an AWGN channel.

(1) Carrier Frequency Offset Rough Estimation Results
Input:
$X_{Receiving\_Training}$=Receiving_Training_Sequence;
$T_{Symbol\_Cycle}$=1/76800;
Output:
Estimated_Frequency_Offset=151.4996 Hz;
Receiving_Training_Sequence is the training sequence extracted by the receiver, and Estimated_Prequency_Ofset is the frequency offset estimated value.
(2) Phase Tracking Results
Input:
$X_{Data}$=Data_Segment;
$X_{Standard\_Constellation}$=Standard_Constellation_Chart;
Output:
Data=Tracking_Valid_Data_Segment;
Description: Data_Segment is the data segment compensated by the frequency offset estimated value, Standard_Constellation_Chart is the standard constellation of 16QAM specified in the VDES protocol, and Tracking_Valid_Data_Segment is the data segment after the phase tracking.
(3) Final Result of the System Error Rate
The error rate of the method err=0.
(4) Estimation Results of the Original Method
The frequency offset estimation of the original method is 205.7408 Hz, and the bit error rate of the system err=0.3973.

Finally, it should be stated that the above embodiments are only used to illustrate the technical solution of the present invention rather than to restrict it; although the invention is described in detail concerning the aforementioned embodiment, the general technical personnel in this field should understand that they can still modify the technical solution recorded in the aforementioned embodiment, or replace some or all of the technical features with equivalents; these modifications or replacements do not make the essence of the corresponding technical solution out of the protection scope of the present invention.

What is claimed is:

1. An improved carrier frequency offset synchronization method for a VDE-TER system, the method runs in a VDE-TER baseband chip, the VDE-TER baseband chip includes an analog-to-digital conversion module, a modulation and demodulation module, a pulse shaping and matching filter module, a frequency offset synchronization module, and a phase tracking module, when the VDE-TER baseband chip is running, the data is synchronized based on the frequency offset synchronization module and the phase tracking module, and then the data is demodulated based on the demodulation module;

the method includes the following steps:
matching and filtering the data at a receiver of the system, and extracting a training sequence from an information data segment after matching and filtering;
performing a carrier frequency offset estimation based on the training sequence to obtain a frequency offset estimated value;
based on the frequency offset estimated value, performing a frequency offset compensation on the information data segment to obtain a first-level compensation data segment;
performing a phase tracking on the first-level compensation data segment to obtain a cumulative phase compensation value, thereby obtaining a second-level compensation data segment; and
demodulating the second-level compensation data segment to obtain the received information after synchronization.

2. The improved carrier frequency offset synchronization method for the VDE-TER system according to claim 1, wherein performing the carrier frequency offset estimation based on the training sequence to obtain the frequency offset estimated value, including:
obtaining a 13-bit Barker code and a corresponding negative code of the 13-bit Barker code in the training sequence;
obtaining a conjugate of the negative code of the 13-bit Barker code in the training sequence;
the conjugate of the negative code of the 13-bit Barker code is one-to-one corresponding to the 13-bit Barker code, and calculating a phase difference respectively, each phase difference corresponds to a frequency offset estimated value; and obtaining the final frequency offset estimated value by averaging 13 frequency offset estimated values.

3. The improved carrier frequency offset synchronization method for the VDE-TER system according to claim 2, wherein performing the phase tracking on the first-level compensation data segment to obtain the cumulative phase compensation value, thereby obtaining the second-level compensation data segment, including:

obtaining the phase difference between a constellation of each data in the first-order compensation data segment and the accurate constellation;

comparing the phase difference of the constellation after adding a previous data bit, the result is as the phase offset compensation value of the next bit; and correcting each bit in the first-level compensation data segment to obtain the second-level compensation data segment based on the phase offset compensation value of each bit.

* * * * *